US009930463B2

(12) United States Patent
Little

(10) Patent No.: US 9,930,463 B2
(45) Date of Patent: Mar. 27, 2018

(54) DEFECT DETECTION VIA AUDIO PLAYBACK

(71) Applicant: SONOS, INC., Santa Barbara, CA (US)

(72) Inventor: Richard Little, Santa Barbara, CA (US)

(73) Assignee: SONOS, INC., Chicago, IL (US)

( * ) Notice: Subject to any disclaimer, the term of this patent is extended or adjusted under 35 U.S.C. 154(b) by 0 days.

(21) Appl. No.: 15/087,314

(22) Filed: Mar. 31, 2016

(65) Prior Publication Data

US 2017/0289717 A1  Oct. 5, 2017

(51) Int. Cl.
  *H04R 29/00* (2006.01)
  *G06F 3/16* (2006.01)

(52) U.S. Cl.
  CPC .......... *H04R 29/007* (2013.01); *G06F 3/165* (2013.01); *H04R 2227/003* (2013.01); *H04R 2227/005* (2013.01)

(58) Field of Classification Search
  CPC .... H04R 29/00; H04R 29/001; H04R 29/002; H04R 29/007
  USPC ..................................................... 381/58, 59
  See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,280,931 B1 * | 10/2007 | Kim .................. G05B 19/4184  700/286 |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

"Denon 2003-2004 Product Catalog," Denon, 2003-2004, 44 pages.

(Continued)

*Primary Examiner* — Katherine Faley

(57) ABSTRACT

Embodiments of detecting detects in a playback device via audio playback are provided. A playback device may play a test sound during a time period, and capture, via one or more microphones of the playback device, the test sound during the time period. A determination that a defect in the playback device has been detected may be based on the recorded test sound.

20 Claims, 6 Drawing Sheets

(56) References Cited

U.S. PATENT DOCUMENTS

| | | | |
|---|---|---|---|
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0251265 | A1* | 11/2006 | Asada ............. H04R 29/001 381/58 |
| 2007/0019817 | A1* | 1/2007 | Siltmann ......... H04R 25/305 381/60 |
| 2007/0142944 | A1 | 6/2007 | Goldberg et al. |
| 2012/0155661 | A1* | 6/2012 | Ma ................. H04L 67/125 381/58 |
| 2014/0335836 | A1* | 11/2014 | Zhang ............. G06F 3/165 455/414.1 |

OTHER PUBLICATIONS

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo" Analog Stereo Jun. 24, 2000 retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

UPnP; "Universal Plug and Play Device Architecture," Jun. 8, 2000; version 1.0; Microsoft Corporation; pp. 1-54.

\* cited by examiner

DEFECT DETECTION VIA AUDIO PLAYBACK

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
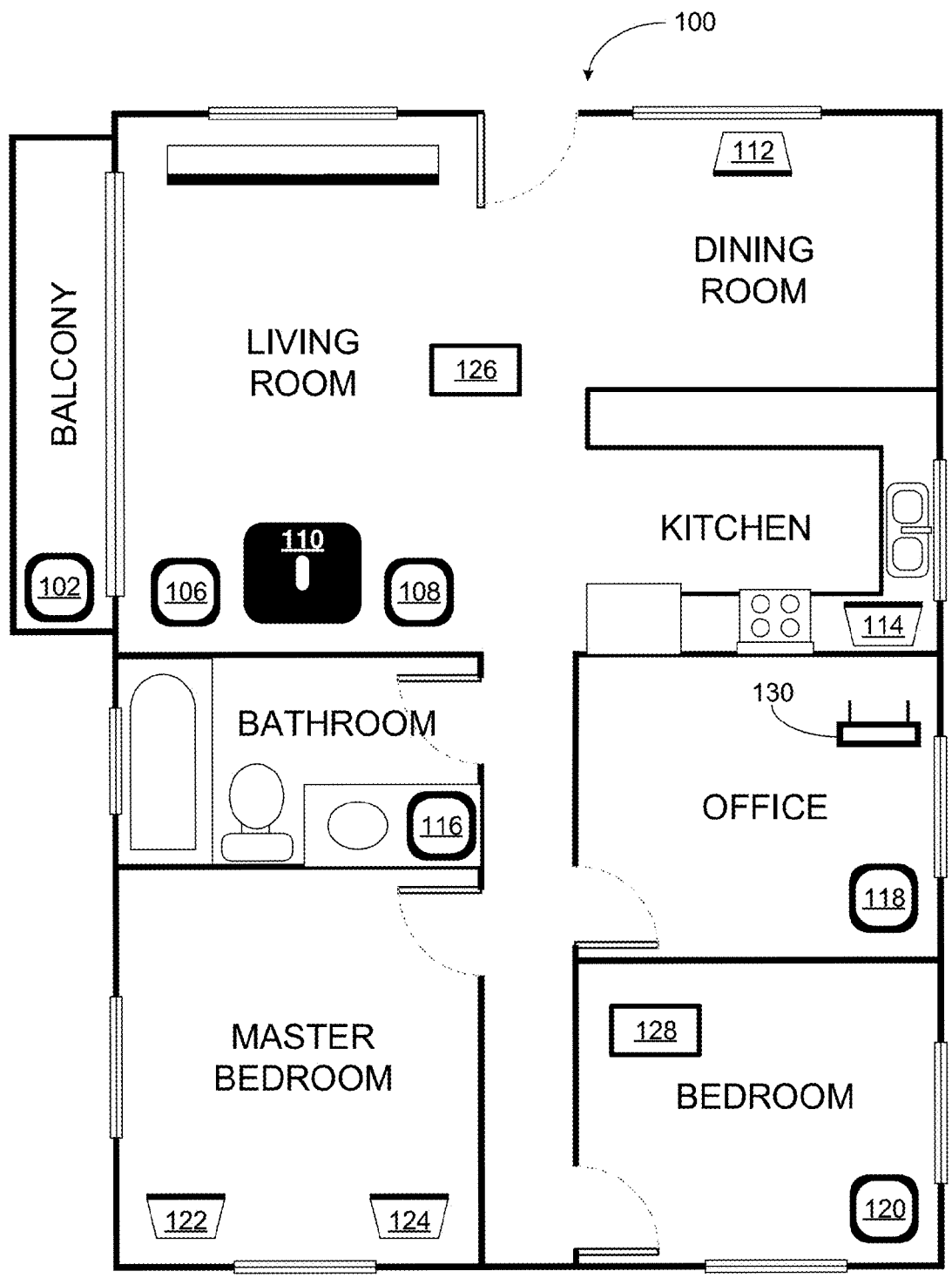
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve detecting for playback device defects and/or abnormal behavior. The defects and/or abnormal behavior may be detected by having the playback device play a test sound. In one embodiment, the playback device may play a test sound which is recorded and then used to determine whether the playback device has a defect and/or abnormal behavior. In another embodiment, playback device usage activity may be monitored, and audio settings of the playback device may be adjusted based on the usage activity.

As indicated above, the examples provided herein may involve detecting a defect via audio playback on a playback device. In one aspect, a playback device is provided. The playback device may include one or more processors, one or more transducers, one or more microphones, and memory having stored thereon instructions executable by the one or more processors to cause the playback device to perform functions. The functions may include playing a test sound via the one or more transducers. The one or more microphones may capture the test sound, and the playback device may record the captured test sound. The playback device may cause the recorded test sound to be compared with an expected test sound. A determination of whether the playback device a defect is determined or exists may be based on the recorded test sound.

In another aspect, a method may be provided. The method may include playing, via a playback device, a test sound, and capturing, via one or more microphones of the playback device, the test sound. The method may further include causing a comparison of the recorded test sound with an expected test sound. A determination that a defect in the playback device exists may be based on the comparison.

In yet another aspect, a non-transitory computer readable memory is provided. The non-transitory computer readable memory has stored thereon instructions executable by a computing device to cause the computing device to perform functions. The functions include playing a test sound and capturing, via one or more microphones of the playback device, the test sound. The functions can further include recording the captured test sound, causing a comparison of the recorded test sound with an expected test sound and determining that a defect in the playback device has been detected based on the comparison.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
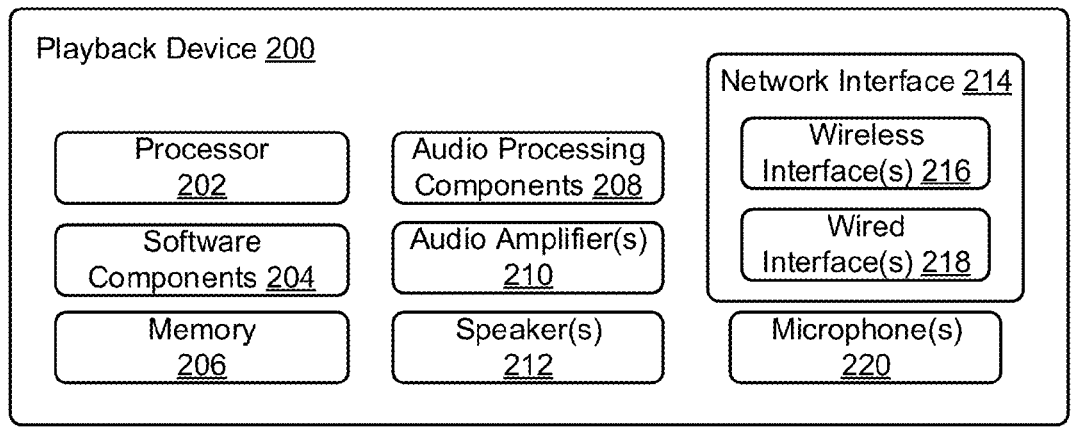
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
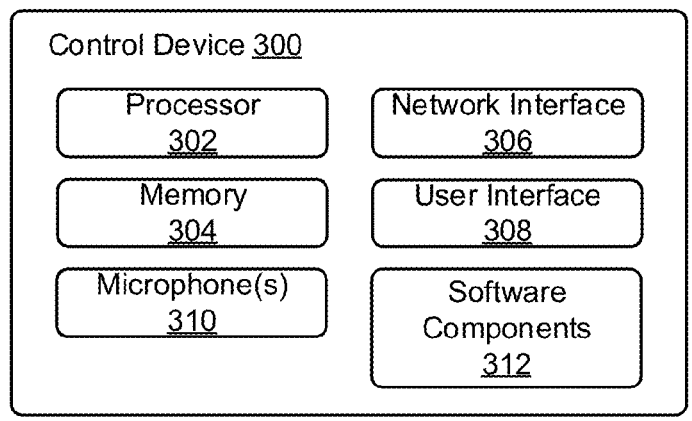
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
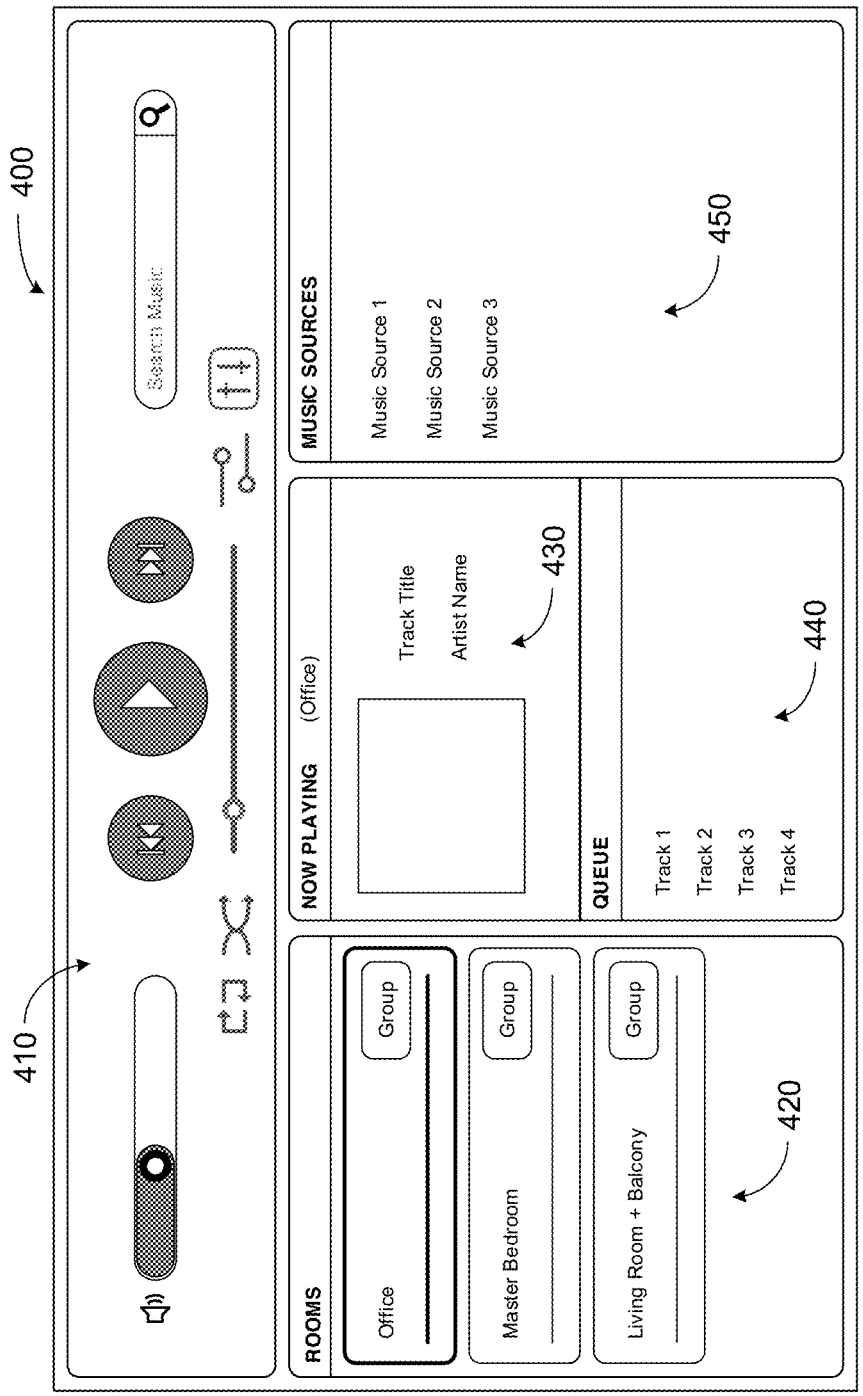
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

Figure 5A:
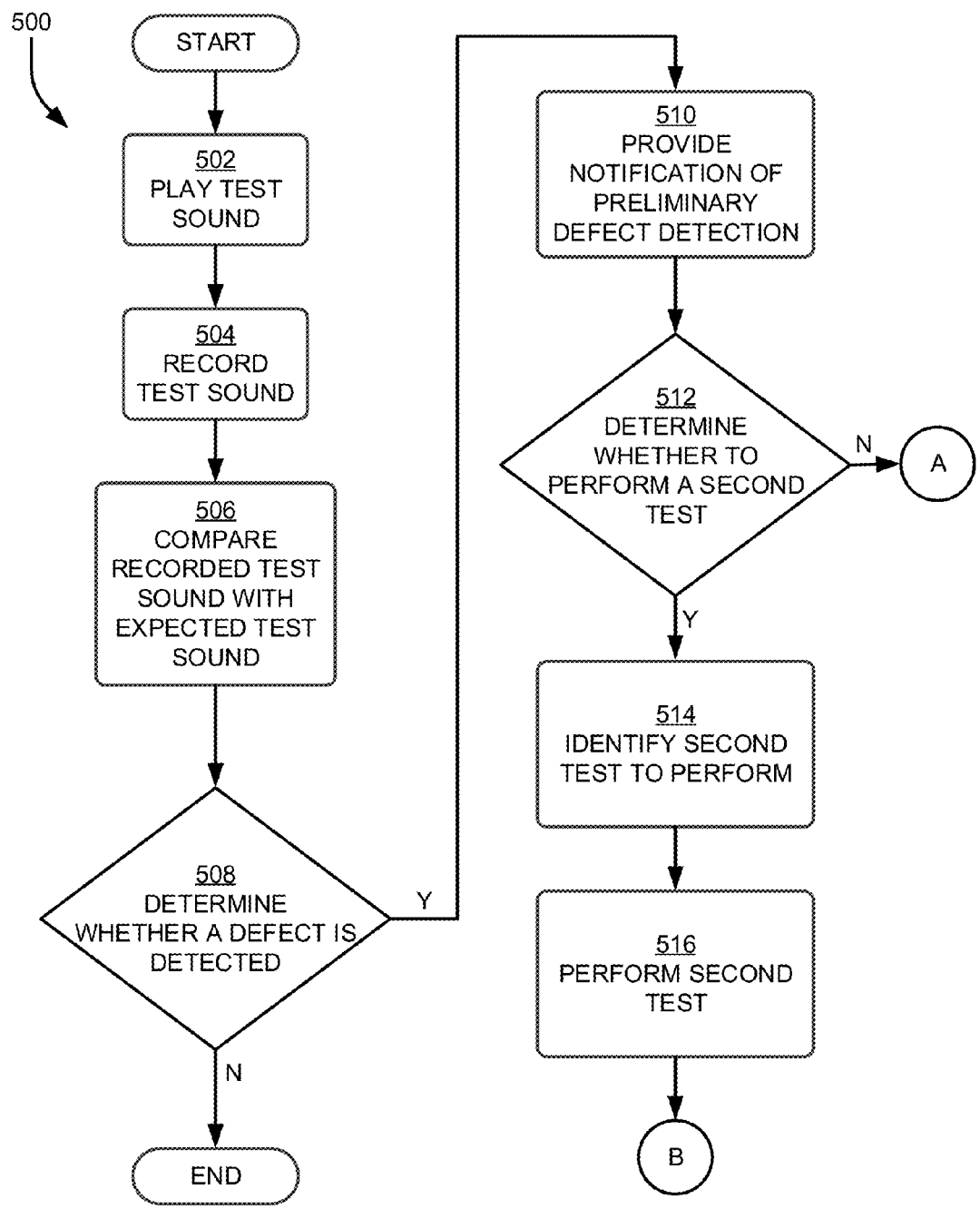
FIGS. 5A and 5B show an example flow diagram for an illustrative method for detecting defects according to aspects described herein.
Figure 5B:
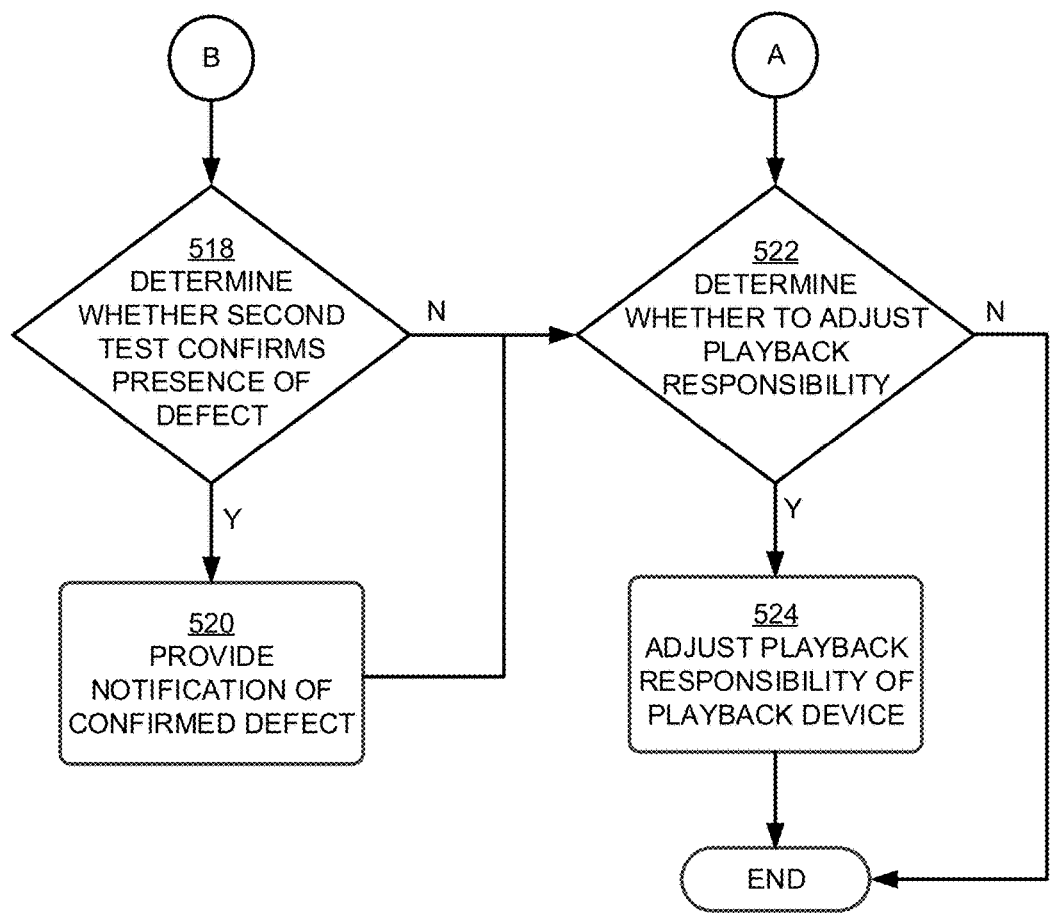

III. Example Method and System of Detecting Defects in a Speaker Via Audio Playback As discussed above, embodiments described herein may involve detecting defects in a speaker via audio playback. Method 500 shown in FIGS. 5A and 5B present an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-524. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIGS. 5A and 5B may represent circuitry that is wired to perform the specific logical functions in the process.

FIGS. 5A and 5B show a flow diagram of an illustrative method 500 of detecting a defect in a playback device (e.g., playback device 200) via audio playback. Defects in a playback device can vary from wear and tear of playback device parts to damaged playback device parts resulting from falling from a height, drops, contact with external objects (e.g., an object entering through the speaker grill), or other accidents. Examples of damaged playback device parts which may be detected via audio playback may include a voice coil of the speaker rubbing against a motor of the playback device, operation fatigue, damaged speaker diaphragm, tinsel wire fatigue, speaker surround tear, and/or other examples speaker damage or operation outside normal behavior.

Defects or other undesirable behavior in the playback device can be experienced by the user in the form of undesirable noise such as rubbing or buzzing sounds and/or undesirable playback quality in the form of missing and/or deviated spectral content. The voice coil rubbing against a motor of the playback device may produce a rubbing or buzzing sound during playback and/or audio being played may have missing or deviated spectral content. Some other defects for which a rubbing or buzzing sound and/or missing or deviated spectral content may be a sign include operation fatigue (e.g., tinsel wire fatigue) and/or physical damage (e.g., damaged speaker diaphragm or surround, loose parts).

Tinsel wire fatigue may occur in a woofer or tweeter and may lead to an open circuit which presents during playback as missing and/or deviated spectral content. As another example, if a surround or suspension which is attached to a basket of the speaker driver and the diaphragm of the speaker driver is torn, the speaker driver may lose some bass output or bass content during playback. Because a speaker driver may be tuned to produce a response within a specific frequency range, the absence of, reduction in, and/or distortion in sound level of spectral content or sound in a frequency range which generally corresponds to the frequency range of the speaker driver may be used to identify a defect in a speaker driver.

At block 502, a device in the system (e.g., control device, playback device, computing device, remote computing device) can initiate or provide an instruction to initiate a defect detection process which may begin with playback of a test sound. For example, a user may select an option on a user interface of a control device 300 to start a defect detection process for a playback device. In another example, a user may initiate the defect detection process at the playback device by, for example, providing input (e.g., selecting a button or combination of buttons) at the playback device. As yet another example, a control device or a remote computing device different from the control device may transmit a command or instruction to the playback device to start the defect detection process. The command or instruction may be transmitted over one or more networks (e.g., LAN, WAN, internet, cellular network, short-range network). The computing device may be, for example, a server remote from the control device and/or the playback device and may be in communication with the control device and/or playback device over one or more networks. For example, a remote user (e.g., customer support specialist) may be initiate the defect detection process remotely from the playback device and/or the control device. The remote user can using the remote server or any other device in communication with the remote server send a message to the control device and/or the playback device to start the defect detection process (e.g., play the test sound). If the message is transmitted to the control device, the control device may relay, transmit, or forward the message to the playback device. In some aspects, the control device can initiate the defect detection process, and the message from the remote server may cause the control device to initiate the defect detection process in response to receiving the message.

In some aspects, the device may automatically initiate the defect detection process based on certain conditions (e.g., during the initial setup or configuration process, in response to a received instruction, in response to meeting or exceeding a threshold playback device age). For example, the defect detection process may be included as part of a calibration procedure such as a room calibration procedure where audio settings of the playback device may be adjusted based on the playback environment as described in U.S. application Ser. No. 14/216,306 filed on Mar. 17, 2014 and issued as U.S. Pat. No. 9,219,460 on Dec. 22, 2015 entitled "AUDIO SETTINGS BASED ON ENVIRONMENT" which is hereby incorporated by reference in its entirety.

The test sound may be a multi-tone audio test signal which may be an audio signal having characteristics where the playback sound would cover the entire audible audio spectrum at the same level and/or selected to have certain playback characteristics based on different factors. Another example of the test sound may be a sequence of tones which may or might not be separated pauses in sound or periods of silence. In some aspects, the test sound that is selected may be tailored for a specific device when the device (e.g., model, serial number, name) or type or category of device (e.g., full-range speaker, mid-range speaker, subwoofer, woofer, frequency response range of the playback device) being tested is known. For example, a full-range audio playback device has a different spectral response focus than a subwoofer. For a subwoofer, a test sound can be more focused in the lower frequency (e.g., bass) range whereas a test sound for a full-range audio playback device may have a frequency response range focused on nearly all of the frequencies which are audible to a human ear.

In some aspects, the test sound may be audio content (e.g., song, music, radio station) that has characteristics that enable usage as the test sound. For example, the characteristics may be spectral characteristics where the song during playback produces tones or sound across a full-range of the audio frequency spectrum or other desired frequency range as described herein. As another example, the audio content may be mixed in a manner that targets certain transducers or drivers or playback devices in a group (e.g., zone group, bonded zone).

Another feature that can be used as a basis for selecting the test sound can be the placement of the playback device such as the orientation (e.g., vertical, horizontal) or mounting type (e.g., ceiling, standing, wall-mounted) of the playback device which may have an effect on the sound characteristics of the playback device as experienced by a listener. As yet another example, test sounds can be selected to focus on specific drivers (e.g., mid-range, tweeter, full-range, subwoofer, woofer, etc.) in the playback device. By having the test sound cause the playback device to only play in particular frequency ranges or audio channels in a stereo configuration (e.g., left channel or right channel in a stereo configuration) or surround configuration (3.1 surround, 5.1 surround, etc.) different types of drivers and/or different speakers can be targeted. For example, to test a woofer in the playback device, the test sound may contain only an audio signal for the frequency response range of the woofer. If a subwoofer is a standalone playback device that is part of a group of speakers (e.g., bonded zone), another playback device may process the sound test and send only the channel or frequency spectrum of audio content that is directed to the subwoofer.

Another basis on which a test sound can be selected is which device(s) is capturing and/or recording the playback of the test sound. The playback device may be playback device 200 which includes microphone(s) that can be used to record the test sound being played by the playback device 200. In some devices, microphone quality may be better than in other types of devices. For example, a microphone in a mobile device or other microphone based device (e.g., voice control device) may be of a higher quality than a microphone in the playback device. In some instances a microphone external to the playback device may be more optimally placed than a microphone in the playback device. For example, an external microphone may be placed in a better location for detecting sound pressure level (SPL) drift in a playback device. In some instances, a playback device might lack a microphone and an external microphone may be used for the defect detection. In some aspects, one device with microphone(s) may capture the test sound while another device records or stores the captured test sound.

The test sound information may originate or be retrieved from a variety of sources. For example, the test sound information may be stored in the device (e.g., control device, playback device, computing device) and/or be transmitted to the device, and the transmission may occur over a network. A request may be transmitted from the playback device to another device, and the playback device may receive the test sound in response to the request. The transmission of the response containing the test sound may occur over a network.

At block 504, a device (e.g., playback device, another nearby playback device, control device) including one or more microphones may record the test sound played by the device in block 502. For example, the same playback device playing the test sound may record the test sound with the microphone of the playback device. As the microphone closest to the playback device's transducers, this microphone may pick up sounds occurring within the playback device as a result of the playback of the test sound which more distant microphones may not be able to capture. Additionally, the microphone of the playback device may be less sensitive and/or susceptible to other noises (e.g., noises produced by other devices and/or people) or events occurring near the playback device and, consequently, the recording by this microphone may be less affected by noises or events external to the playback device such as other noise producing objects, animals, or people in the vicinity of the playback device. Because the playback device is playing the test sound as well as recording the test sound, the playback device knows when the test sound will be produced and can cause the microphone to start recording at the same time as playback of the test sound.

In some aspects, a device different than the playback device may record the test sound in addition to or instead of the playback device recording the test sound. For example, control device 300 may record the test sound being played back from another playback device. Control device 300 or any other recording device may begin recording at any time or may begin recording in response to a particular event such as detecting the beginning of the test sound and/or upon expiration of a timer. For example, the playback device being tested and control device 300 may coordinate the beginning of playback of the test sound and the ending of the playback of the test sound. The recording of the test sound may be started and ended at the same time using a time stamp and/or timer. In some instances, control device 300 may already be recording sound played by the playback device as part of a calibration procedure and may incorporate the recording of test sound with the recording of a calibration tone. The portion of the recording related to the test sound may be delineated from the portion of the recording related to the calibration tone using time stamps to mark the beginning and end of the test sound portion of the recording. In some aspects, because the playback device being tested might not have a microphone, another device such as control device 300 may have to record the test sound. The microphone device may stream (e.g., buffer and stream in real-time) the captured test sound to another device for recording.

At block 506, the recording of the test sound may be compared with an expected test sound. The comparison may be performed by one or more devices (e.g., control device, computing device and/or playback device) using a variety of techniques, and the expected test sound may be stored on and/or transmitted to the one or more devices. For example, a computing device may store the expected test sound and receive the recording of the test sound from control device 300 which recorded the test sound. As another example, the recording device may transmit a comparison request to another device (e.g., control device, computing device, playback device), and the comparison request may include information regarding the playback device which played the test sound and the recording of the test sound.

In analyzing the recorded test sound and the expected sound, a defect in the playback device may be detected when a difference which exceeds and/or is equal to a threshold is determined from the comparison. The difference may be determined by, for example, comparing the spectral response of the recorded test sound and the spectral response of the expected test sound. If the difference is greater than a threshold value (e.g., amplitude difference such as decibel difference at a particular frequency or decibel difference of an average decibel over a frequency range, percentage amplitude difference), then a defect may be detected for the playback device. In some aspects, a defect may be detected if a difference between the recorded test sound and the expected test sound is less than and/or equal to a threshold from the comparison. If a test sound is designed to elicit a playback response which has a difference that is greater than or equal to a difference threshold when compared with the expected test sound, a difference between the recorded test sound and expected test sound greater than or equal to difference threshold may be an indication that a defect exists in the playback device.

Another marker that may indicate the existence or presence of a defect or other fault condition in the playback device may be the absence of certain spectral content and/or the presence of deviated spectral content. An example technique that may be used to determine that certain spectral content is absent or to identify the presence of deviated spectral content may be to apply a fast Fourier transform (FFT) to the recorded test signal and the expected test signal and use spectral content analysis to identify difference(s) between the recorded test sound and the expected test sound which may be indicative of defect(s) in the playback device.

In some aspects, the presence of a defect may be determined without a comparison of the recorded test sound and the expected test sound. For example, a playback device may be tuned to have a substantially level frequency response. For such a playback device, a dip or valley in the frequency response curve may signal or indicate missing and/or deviated spectral content.

Another technique to determine the presence of rubbing and/or buzzing type defects may include using a multi-tone distortion type analysis. A multi-tone distortion analysis can be performed to detect for problems involving playback device parts rubbing against each other and/or buzzing sounds resulting from parts moving within the playback device. A distortion analysis can determine whether missing and/or deviated frequencies are being output by the playback device. For example, if the test sound is a multi-frequency tone that plays at the same level across the entire spectrum and the playback device outputs specific frequencies at different levels, then distortion may be present. Missing frequencies may be another example of distortion. Detecting frequencies outside of the frequency range of the multi-frequency tone may be yet another example of distortion. Another example of distortion can be a phase shift that may or might not vary by frequency. Each of these types of distortion and other types of known distortion may be identified or determined as described herein by comparing the recorded test sound and an expected test sound.

Another technique for determining whether a defect is detected may use neural networks. The neural network may be trained to recognize normal and/or abnormal speaker behavior or characteristics. The neural network may be trained for abnormal and/or normal behavior using recordings of playback devices with known abnormal conditions or defects playing the test sounds. Because devices with the same type of defect may have common characteristics (e.g., sounds in the same frequency range, particular sounds in the same time range, similar sounds in response to certain tones in the test sound). As another example, if the recording of the test sound has a low match or a match value below a threshold to normal behavior, the playback device may be identified as having a defect or other abnormal behavior. In yet another example, if the difference between the recorded test sound characteristics and the expected test sound characteristics is greater than or equal to a threshold, then the playback device may be identified as having a defect.

At block 508, the system determines whether a defect is detected based on the results of the processing performed in block 506. If a defect is not detected at block 508, method 500 may be completed and/or may be performed again in the future periodically or aperiodically. If a defect is determined to be present based on the results of the comparison performed in block 506, method 500 may proceed to block 510.

At block 510, a notification may be provided to indicate a defect has been detected. The notification may indicate preliminarily that a defect has been detected. The notification provided in block 510 may include a prompt or a link for the user to select to initiate the second test if the second test is recommended based on the first test. A user selection of the prompt or link may cause transmission of a command to the playback device or another computing device to initiate a second test. The notification may be in the form of a notification to the user and/or to customer support of a company providing assistance or support with the playback device. The notification may be in the form of an email, text, pop-up, prompt, voice, and/or other form of communication. The notification may or might not be in a user interactive format.

At block 512, method 500 may determine whether to perform a second test. Based on the type of defect detected in block 508, a second test may be performed to confirm and/or to further identify the type of defect present in the playback device. If, in block 512, the system determines not to perform a second test, method 500 may proceed to block 522 to determine whether to adjust playback responsibility in view of a detected defect in the playback device. If the system determines that a second test may be performed, method 500 may proceed to block 514 to identify the second test to perform. The second test to perform may be the same or a different test than the test performed in blocks 502-504. The determination of whether to perform a second test can depend on a variety of factors such as the device type, types of drivers in the device, numbers of drivers, and/or defect type identified from the first test.

A second test that can be performed may be a test tailored to further identify and/or collect more details on the type of defect determined in block 508 because different types of defects may have different characteristics. The second test may be a test tailored to the particular device category, for example, if the test sound played in step 502 is a standard or generic test sound used for all devices or devices of a certain type (e.g., subwoofer, sound bar, full-range, etc.) similar to the first test sound. For example, a test which is focused on exacerbating undesirable noises may be different and have different audio characteristics than a test targeted to identifying missing and/or deteriorated spectral content.

The second test may be adapted or adjusted based on the results of the first test. For example, a first test may identify a general range of frequencies in which the playback device has missing and/or deteriorated spectral playback characteristics. The second test may be tailored to the general range of frequencies with abnormal or undesirable characteristics identified from the first test. For example, the second test may play audio signals only within the general range of abnormal frequencies which may include playing individual frequencies to further identify the specific problematic frequencies and/or playing different combinations of frequencies. The second test may be a sequence of tones in the same or different frequencies. The sequence of tones may be played with and/or without pause between each tone. Using a sequence of tones may be helpful in the situation where playing a tone at a frequency or within a frequency range may cause the playback device to produce a sound in a different frequency (e.g., harmonic frequency).

Similar to the first test sound, the second test may focus on certain transducers or drivers within the playback device such as full-range transducers, mid-range transducers, woofers, and/or tweeters. Transducers within the same playback device may have overlapping or the same frequency output ranges. Because of the overlapping or same frequency output ranges, the second test may be a test used to discern which of the transducers in the same playback device are problematic. The second test may target each transducer of the playback device by playing a test sound specific to the frequency range of the transducer and/or including information (e.g., channel information) with the test signal about which transducer to direct a portion or entirety of the test signal.

At block 516, the second test identified in block 514 may be performed. Similar to the first test, the second test may use the playback device and/or a computing device as the recording device. The second test may or might not use the playback device as the recording device. As discussed earlier herein, a microphone external to the playback device may be used to record the test sound in the second test. The microphone used to record the second test may be the same or different from the microphone used to record the first test.

In block 518, the results of the second test can be analyzed to determine whether the second test provided positive results such as confirming and/or further identifying the type of defect present. A notification can be provided at block 520 indicating the results of the second test (e.g., a positive, negative, or inconclusive result). The notification in block 520 may be similar to the notification provided in block 510. The format of the notification may be the same or different than the format of the notification in block 510.

If the second test is inconclusive and/or provides a different result than the result in block 508 (e.g., false positive) method 500 may proceed to block 522 and/or conduct another sound test which may be performed in a manner similar to the first test and/or the second test. At block 522, the system can determine whether to adjust playback responsibility of the playback device which may have a defect. If the system determines to adjust playback responsibility of the playback which has a defect, the method may proceed to block 524 and adjust playback responsibility. Blocks 522 and 524 may be performed as described in U.S. patent application Ser. No. 13/489,674 filed Jun. 6, 2012 issuing as U.S. Pat. No. 8,903,526 on Dec. 2, 2014 and entitled "Device playback failure recovery and redistribution," which are hereby incorporated by reference in their entirety.

While method 500 has been described with respect to conducting a first test or conducting a first test and a second test, more than two tests may be performed. For example, blocks 512-520 may be repeated as appropriate to further refine the test results or to better identify the specific defect present in the playback device. As described in blocks 512-520, each further test may be further tailored to the playback device and/or detected defect and can be based on the results of the previous one or more tests.

Figure 6:
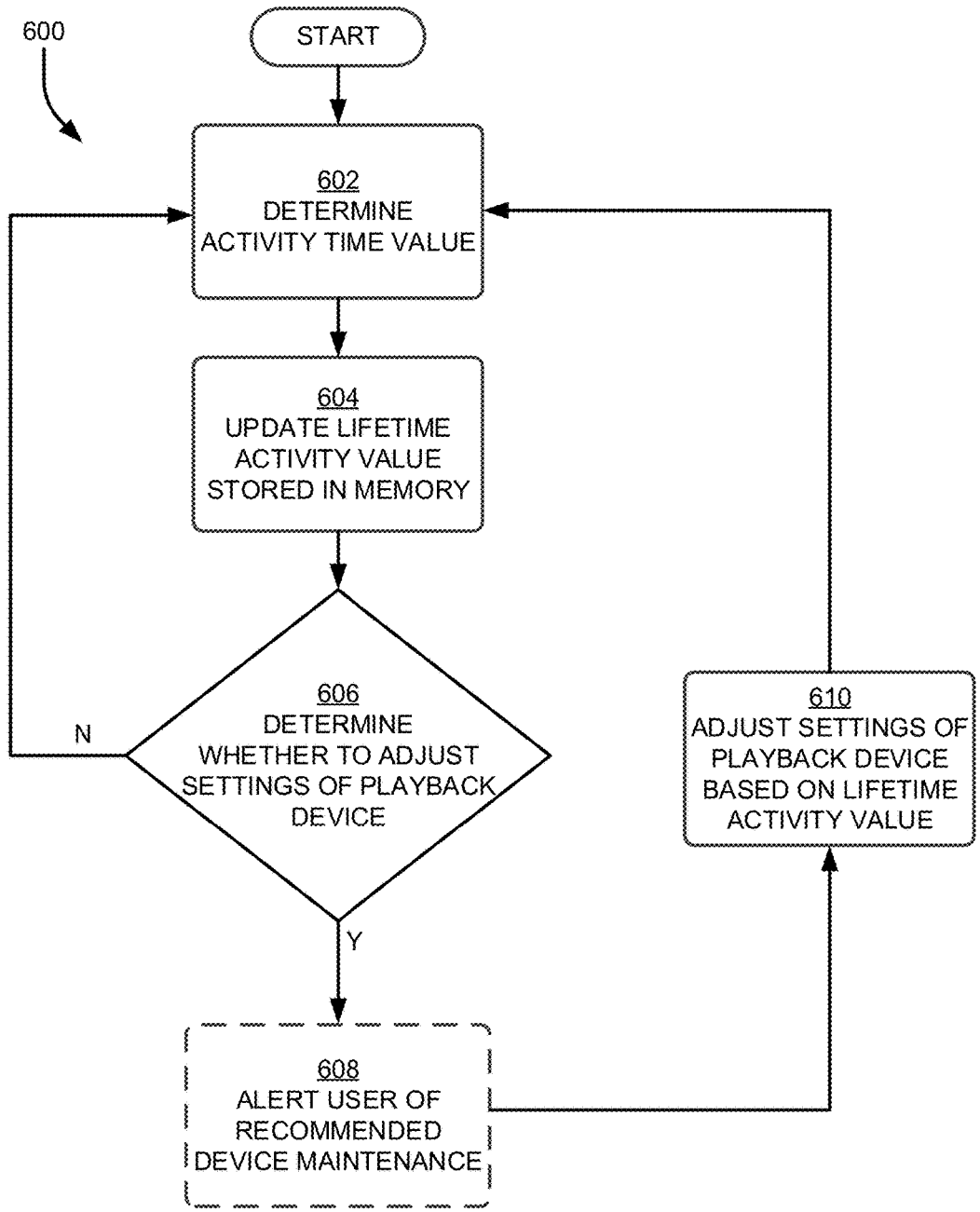
FIG. 6 shows an example flow diagram for an illustrative method for adjusting audio settings based on usage activity according to aspects described herein.

IV. Example Method and System of Adjusting Playback Device Settings Based on Usage Activity As discussed above, embodiments described herein may involve detecting defects in a speaker via audio playback. Method 600 shown in FIG. 6 presents an embodiment of a method that can be implemented within an operating environment involving, for example, the media playback system 100 of FIG. 1, one or more of the playback device 200 of FIG. 2, and one or more of the control device 300 of FIG. 3. Method 600 may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

FIG. 6 depicts a flow diagram of a method 600 for adjusting playback device settings based on usage activity. As the playback device is used, the playback device's sound or performance characteristics (e.g., sound pressure level) may change over time which may cause undesirable and/or suboptimal playback characteristics (e.g., lower volume output, less efficient volume output). In some instances, the frequency response at certain frequencies or in certain frequency ranges may improve or become more efficient over time such that a rebalancing may be performed to retune the playback device to a desired frequency response curve. In response to the change in the playback device's sound or performance characteristics, audio settings of the playback device may be adjusted to compensate for the change.

At block 602, a device (e.g., control device, playback device, server) can determine an activity time value for the playback device. The activity time value may be the total or lifetime amount of time that a playback device is active (e.g., powered on) which may include total activity across all types of activity (e.g., lifetime activity value) and/or the activity value may be collected individually for different categories or types of usage activity (e.g., playback time, standby time, streaming time, paused time, grouped time, bonded time, surround sound configuration time, stereo pair configuration time, wired connectivity, wireless connectivity, channel specific playback time (e.g., left channel, right channel, center channel, rear left channel, rear right channel, subwoofer channel, etc.). The amount of time that the playback device spends performing certain activities may be tracked individually and/or collectively and used to update a total time for the activity mode when the playback device enters a new activity mode. The total time may be updated in increments of time spent in the activity mode (e.g., every x seconds, minutes, or hours). Different activity modes may be, for example, time spent playing back media content, time that the playback device is powered on, and/or time spent in standby mode. Active time during which the playback device is unassociated with a household identifier can be tracked. This time may indicate usage prior to activation by a customer (e.g., usage or testing during production).

A time stamp may be determined at the time an activity mode is started and ended to determine the amount of time that the playback device spent in the activity mode. As another example, one or more timers which may run concurrently may be started each time an activity mode is started and stopped each time an activity mode ends, and the timer value may be stored as the amount of time lapsed or spent in each activity mode.

At block 604, the playback device can update the lifetime activity value stored in the memory of the playback device for the particular activity. The activity time value can be added to the stored lifetime activity value stored in the memory to achieve a running total of lifetime time spent in the various activity modes. The updated lifetime value may be again be stored in the memory. Each lifetime value update may be stored in the memory with a time stamp to provide a history of usage and/or track usage. The lifetime activity value may be stored in a memory outside of the playback device (e.g., control device, remote computing device, or other device).

At block 606, the system can determine whether to adjust settings of the playback device based on activity values and/or the lifetime activity values. The determination of whether to adjust settings of the playback device may be based on various activity values including individual and/or collective values, and the various activity values may be compared to a corresponding threshold to determine whether to adjust the audio settings based on activity values. For example, a lifetime aging curve may be used to determine audio settings to apply to a playback device based on the specific activity values associated with the playback device. For example, different audio settings (e.g., equalization settings) may be applied to the playback device for different amounts of playback time or different ranges of playback time.

If it is decided not to adjust settings of the playback device, the method may return to block 602 to determine or monitor the amount of time that the playback device performs different activities. If it is decided to adjust the audio settings of the playback device at block 606, the method may proceed to optional block 608 or directly to block 610.

At block 608, the user may be notified of recommended device maintenance. In some aspects, the adjustment may be performed automatically by the playback device or other device in the system. If the adjustment is performed automatically by the playback device, the user might not receive an alert in block 608 and method 600 may proceed to block 610. In some aspects, the adjustment may be a process initiated by the user. For example, the user may perform the room calibration process again which may or might not include detecting for defects according to method 500 as described herein. The alert or notification may be similar to the type of notification (e.g., e-mail, prompt, text message, pop-up window, voice feedback) provided in block 510.

At block 610, the playback device can adjust settings of the playback device based on lifetime activity value and/or individual values. The playback settings adjusted may be equalization settings of the playback device, and the equalization settings used for the playback device may vary depending on the lifetime value and/or individual activity values. For example, different parts (e.g., voice coil, surround, diaphragm, motor) of the playback device may age or change at different rates in view of the activity values. Moreover, the playback device may have a "break-in" period where usage of a fairly new playback device (e.g., low activity values) may cause the audio characteristics to change quickly during a particular time period.

The audio settings applied to the playback device may become the new default audio settings, and any further adjustment of audio settings by the user (e.g., genre-based equalization setting, media content type audio settings (e.g., spoken audio, movie)) may be applied on top of the audio settings applied based on lifetime activity values.

Method 600 may proceed from block 610 and return to block 602 to determining the activity time value and updating the value in memory. Method 600 may be performed periodically or aperiodically and/or in response to specific events (e.g., receiving an instruction to calibrate the playback device based on usage).

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein may involve detecting a defect via audio playback on a playback device. In one aspects, a playback device is provided. The playback device may include one or more processors, one or more transducers, one or more microphones, and memory having stored thereon instructions executable by the one or more processors to cause the playback device to perform functions. The functions may include playing a test sound via the one or more transducers. The one or more microphones may capture the test sound during the time period, and the playback device may record the captured test sound. The playback device may cause the recorded test sound to be compared with an expected test sound. A determination of whether the playback device has a defect may be based on the comparison.

In another aspect, a method may be provided. The method may include playing, via a playback device, a test sound, and capturing, via one or more microphones of the playback device, the test sound. The method may further include causing a comparison of the recorded test sound with an expected test sound. A determination that a defect in the playback device has been detected may be based on the recorded test sound.

In yet another aspect, a non-transitory computer readable memory is provided. The non-transitory computer readable memory has stored thereon instructions executable by a computing device to cause the computing device to perform functions. The functions include playing a test sound and capturing, via one or more microphones of the playback device, the test sound. The functions can further include recording the captured test sound, causing a comparison of the recorded test sound with an expected test sound and determining that a defect in the playback device exists based on the recorded test sound.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A playback device, comprising:
   one or more processors;
   one or more transducers configured to output sound;
   one or more microphones;
   memory comprising instructions that, when executed by the one or more processors, cause the playback device to perform functions comprising:
      performing a first test, wherein performing the first test comprises:
         playing back, via the one or more transducers, a first test sound;
         recording, via the one or more microphones, the first test sound, wherein the recorded first test sound comprises audio data in a range of frequencies; and
         detecting, based on the recorded first test sound, data indicating a defect of the playback device based on the recorded first test sound, wherein the data indicating the defect comprises data in a subrange of frequencies of the range of frequencies having at least one of (i) missing spectral characteristics and (ii) deteriorated spectral playback characteristics with respect to an expected test sound;
      based on the data indicating the defect of the playback device, performing a second test that is different than the first test, wherein performing the second test comprises:
         playing back, via the one or more transducers, a second test sound comprising only audio within the subrange of frequencies;
         recording, via the one or more microphones, the second test sound; and
         determining details on the defect of the playback device based on the recorded second test sound.

2. The playback device of claim 1, wherein the functions further comprise:
   causing a comparison of the recorded first test sound with the expected test sound.

3. The playback device of claim 2, wherein detecting the data indicating the defect in the playback device comprises:
   receiving, from a computing device, an indication of the defect based on the comparison.

4. The playback device of claim 1, wherein the first test sound comprises a multi-tone audio signal.

5. The playback device of claim 1, wherein the functions further comprise:
   transmitting, to a computing device, a message indicating that the defect has been detected.

6. The playback device of claim 1, wherein the functions further comprise:
   monitoring time periods of activity; and
   storing active time information comprising the time periods of activity.

7. The playback device of claim 6, wherein the functions further comprise:
   comparing the active time information with a time threshold;
   determining that active time information is at least the time threshold;
   in response to determining that the active time information is at least the time threshold, initiating a re-calibration mode; and
   in response to initiating the re-calibration mode, playing the first test sound.

8. The playback device of claim 6, wherein the functions further comprise:
   comparing the active time information with a time threshold;
   determining that the active time information is less than the time threshold;
   in response to determining that the active time information is less than the time threshold, adjusting audio settings according to predetermined audio settings based on the active time information.

9. A method, comprising:
   performing a first test, wherein performing the first test comprises:
      playing back, via a playback device, a first test sound;
      recording, via the playback device, the first test sound, wherein the recorded first test sound comprises audio data in a range of frequencies; and
      detecting, based on the recorded first test sound, data indicating a defect of the playback device based on the recorded first test sound, wherein the data indicating the defect comprises data in a subrange of frequencies of the range of frequencies having at least one of (i) missing spectral characteristics and (ii) deteriorated spectral playback characteristics with respect to an expected test sound;
   based on the data indicating the defect of the playback device, performing a second test that is different than the first test, wherein performing the second test comprises:

playing back, via the one or more transducers, a second test sound comprising only audio within the subrange of frequencies;

recording, via the one or more microphones, the second test sound; and determining details on the defect of the playback device based on the recorded second test sound.

10. The method of claim 9, further comprising:

causing a comparison of the recorded first test sound with the expected test sound.

11. The method of claim 10, wherein detecting the data indicating the defect in the playback device comprises:

receiving, from a computing device, an indication of the defect based on the comparison.

12. The method of claim 9, further comprising:

transmitting, to a computing device, a message indicating that the defect has been detected.

13. The method of claim 9, further comprising:

monitoring time periods of activity; and storing active time information comprising the time periods of activity.

14. The method of claim 13, further comprising:

comparing the active time information with a time threshold;

determining that the active time information is at least the time threshold;

in response to determining that the active time information is at least the time threshold, initiating a re-calibration mode; and in response to initiating the re-calibration mode, playing the first test sound.

15. The method of claim 13, further comprising:

comparing the active time information with a time threshold;

determining that the active time information is less than the time threshold;

in response to determining that the active time information is less than the time threshold, adjusting audio settings according to predetermined audio settings based on the active time information.

16. A non-transitory computer-readable medium storing instructions that when executed by a playback device cause the playback device to perform functions comprising:

performing a first test, wherein performing the first test comprises:

playing back a first test sound during a first time period;

recording, via one or more microphones of the playback device, the first test sound, wherein the recorded first test sound comprises audio data in a range of frequencies;

and detecting, based on the recorded first test sound, data indicating a defect of the playback device based on the recorded first test sound, wherein the data indicating the defect comprises data in a subrange of frequencies of the range of frequencies having at least one of (i) missing spectral characteristics and (ii) deteriorated spectral playback characteristics with respect to an expected test sound;

based on the data indicating the defect of the playback device, performing a second test that is different than the first test, wherein performing the second test comprises:

playing back, via the one or more transducers, a second test sound during a second time period, wherein the second test sound comprises only audio within the subrange of frequencies;

recording, via the one or more microphones, the second test sound; and determining details on the defect of the playback device based on the recorded second test sound.

17. The non-transitory computer-readable medium of claim 16, wherein the functions further comprise:

causing a comparison of the recorded first test sound with the expected test sound.

18. The non-transitory computer-readable medium of claim 17, wherein detecting the data indicating the defect in the playback device comprises: receiving, from a first computing device, an indication of the defect based on the comparison, and wherein the functions further comprise: transmitting, to the first computing device or a second computing device, a message indicating that the defect has been detected.

19. The non-transitory computer-readable medium of claim 16, wherein the functions further comprise:

monitoring time periods of activity; and storing active time information comprising the time periods of activity.

20. The non-transitory computer-readable medium of claim 16, wherein the functions further comprise: monitoring time periods of activity; storing active time information comprising the time periods of activity; comparing the active time information with a time threshold; determining that the active time information is at least the time threshold; in response to determining that the active time information is at least the time threshold, initiating a re-calibration mode; and in response to initiating the re-calibration mode, playing the first test sound.

* * * * *